(12) United States Patent
Susnfara et al.

(10) Patent No.: US 6,839,041 B2
(45) Date of Patent: Jan. 4, 2005

(54) VIRTUAL REALITY VIEWING SYSTEM AND METHOD

(75) Inventors: Kenneth J. Susnfara, Birdseye, IN (US); Philip J. Poth, Seattle, WA (US); Gregory S. Greer, Seattle, WA (US)

(73) Assignee: Thermwood Corporation, Dale, IN (US)

(*) Notice: Subject to any disclaimer, the term of this patent is extended or adjusted under 35 U.S.C. 154(b) by 405 days.

(21) Appl. No.: 10/153,596

(22) Filed: May 24, 2002

(65) Prior Publication Data

US 2003/0025652 A1 Feb. 6, 2003

Related U.S. Application Data

(63) Continuation-in-part of application No. 09/919,717, filed on Aug. 1, 2001.

(51) Int. Cl.[7] ............................................. G09G 5/00
(52) U.S. Cl. ............................ 345/8; 345/158; 359/630
(58) Field of Search ................................ 345/7–9, 158; 359/630

(56) References Cited

U.S. PATENT DOCUMENTS

| | | | | |
|---|---|---|---|---|
| 5,917,460 A | * | 6/1999 | Kodama | 345/8 |
| 5,959,597 A | * | 9/1999 | Yamada et al. | 345/8 |
| 6,377,401 B1 | * | 4/2002 | Bartlett | 359/630 |
| 6,765,726 B2 | * | 7/2004 | French et al. | 359/630 |

* cited by examiner

Primary Examiner—Alexander Eisen
(74) Attorney, Agent, or Firm—Stevens, Davis, Miller & Mosher, LLP

(57) ABSTRACT

A virtual reality viewing system and method senses the motions of a viewer providing a sequence of viewing perspectives and creates a real time image to the viewer based upon a probable viewing image. The system and method accounts for latency between the movement of the viewer and generation of the viewed image by generating a spline based upon measured velocities of the viewer's head and creates a look-ahead velocity based upon the spline and a dampening factor. Then an image is generated based upon the look-ahead velocities and displayed to the viewer. The dampening factor smoothes the look-ahead velocities by adding latency back into the look-ahead velocities to account for sudden movements of the viewer.

19 Claims, 2 Drawing Sheets

VIRTUAL REALITY VIEWING SYSTEM AND METHOD

This application is a continuation-in-part of application Ser. No. 09/919,717, filed Aug. 1, 2001.

FIELD OF THE INVENTION

The present invention relates to the field of computer graphic imaging, and more particularly the field of virtual reality viewing.

BACKGROUND OF THE INVENTION

A virtual reality system generally consists of a head mounted graphic display connected to a computer, along with a method for communicating to the computer, the exact direction in which the person wearing the head mounted display is facing. The purpose of a virtual reality system is to create for the person wearing the display, the illusion of being in a different location. In order to achieve this, the computer displays the virtual environment as if it were being viewed from both the position and the direction that the person is looking. As the person moves its head and the head mounted display, the computer continuously changes the image being viewed to show the virtual environment from the current perspective. Thus, it appears to the person wearing the display that they are actually in the virtual environment and are looking around.

A variation of this approach can be called telepresence. In this system, instead of a computer generating the image, the image is generated by a controlled, movable video camera. As the person wearing the display moves its head, the camera, in a remote location, moves correspondingly, showing the location from the orientation of the remote viewer. This system thus makes it appear to the viewer that it is actually in the remote location and looking around.

Both of these systems have a serious drawback that reduces the effectiveness of the illusion that the person wearing the display is actually in a different location. The problem is latency. Latency, in this context, is defined as the time required to calculate the perspective and position from which the viewer is facing, transmit this information to the computer or the remote camera, generate the view from the new orientation, and transmit that view back to the display. Should the latency be long enough, the viewer may be facing a slightly different direction when the image from the earlier sampling is finally displayed. The effect is to make the environment, which should be positionally stable, seem to move. This effect can be troubling and may cause disorientation in some users.

In an effort to overcome this problem, faster sensors, computers and transmission methods have been employed. However, even a small amount of latency reduces the effectiveness of the system. As long as any amount of latency exists, the illusion will not be complete.

SUMMARY OF THE INVENTION

The present invention serves to overcome the deficiencies of prior art systems by providing a means for presenting the image to the person wearing the display, in such a manner as to display the selected environment from the exact perspective from which the viewer is facing, any time, without latency, thus offering a realistic feeling of being immersed in the selected environment.

Instead of reading the current position of the viewer's head and creating an image from that perspective, the present invention uses several readings from the head position sensor to determine the direction, velocity and acceleration of the viewer's head. Using this information, the system calculates the direction in which the viewer will be looking when the image finally reaches the display and creates the image from that direction rather than from the direction that the viewer was facing when the sensor readings were taken.

When using a remote camera to create the image, the camera is moved into the position that corresponds directly with the perspective point from which the viewer will be facing, based on the calculations of direction, velocity and acceleration, when the image from the camera reaches the display.

When compared to the speed of electronic data processing or the slew rates of modern servo systems, the human body moves and accelerates at a very slow rate. It is thus not only possible to measure and calculate the future position of the viewer's head, but is equally possible to move a camera to the new position fast enough to generate a realistic view from that anticipated position.

DETAIL DESCRIPTION OF THE PREFERRED EMBODIMENTS OF THE INVENTION

Figure 1:
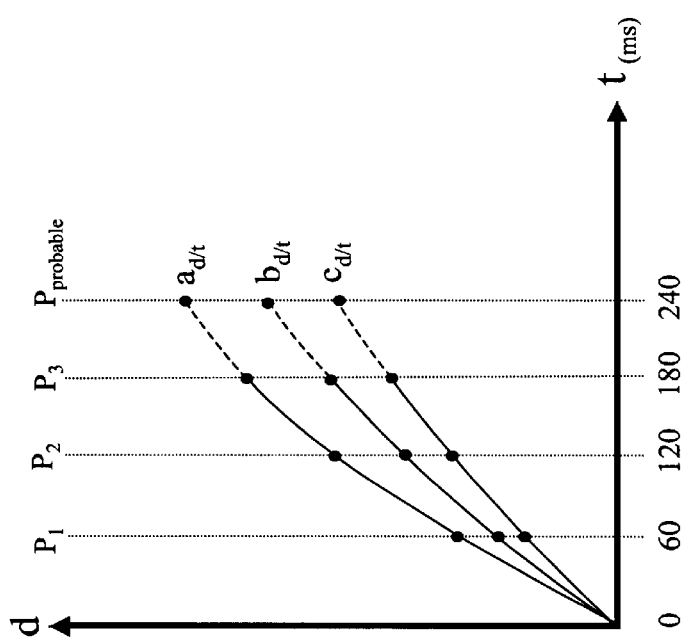
FIG. 1 is a graphic representation of 3 real-time-phased d/t curves.

A virtual reality system generally comprises a display/sensor apparatus that is worn by a viewer and connected to a computer system capable of manipulating the position and perspective of the image viewed in the display to correspond with the position from which it is being viewed. Connected to such apparatus are one or more position encoding devices providing positional feedback representative of the angular displacement of various axes of rotation. Certain systems may also provide representations of various linear displacements in the vertical and horizontal directions.

There are numerous methods in use for providing positional feedback to the host computer. One method utilizes ultrasonic sensors to track position by triangulation, based on the varying time lag produced between different sets of emitters and receivers. Another method utilizes sets of coils, pulsed to produce magnetic fields. Magnetic sensors then determine position by measuring the varying strength and angles of the magnetic fields. Another typical method utilizes mechanical photo-optic pulse encoders that provide a plurality of pulses corresponding with a change of displacement between the encoder and the device to which it is attached.

Based on the aforementioned descriptions, it is evident that there are a number of different types of sensors and encoding devices that are suitable for providing positioning information to a computer, all of which are well known in the art. Regardless of the fact that the methods and devices are diverse in nature, each serves the primary purpose of providing a positioning signal to the host computer.

The present invention utilizes a spline path calculated from a distance vs. time curve to generate the anticipated position of the viewer in all axes, and then computes an anticipated perspective view, transmitting it to the display slightly ahead of the viewer's current perspective and position. For the purpose of description, the photo-optic pulse encoder type sensor will be exemplified herein. It is to be understood, however, that a signal derived from virtually any available sensing device may be processed to generate a distance vs. time curve for the purpose of deriving a probable spline path.

As the viewer moves in various directions, the displacement of each encoder changes accordingly, producing a stream of pulses. The number of pulses produced corresponds proportionally with the movement of the viewer. Such pulses are counted for specific time increments equaling approximately 60 milliseconds. The number of pulses counted in each 60-millisecond increment for a given axis represents the amount of movement that occurred in that axis over a predetermined time period. Based upon a distance versus time curve representing such movement, a probable axis path is derived to calculate the probable future position in all axes as well as an anticipated perspective view. This information is then transferred to the display slightly ahead of the viewer's current perspective to compensate for latency.

The speed at which each axis moves through a given time period is not constant, but instead changes at a random rate, thus the position that each axis will assume at a given point in time is not predictable. To overcome the unpredictability, a probable position for each axis is calculated. FIG. 1 shows a displacement versus time graph exemplifying the paths of three rotary axes, expressed as $a_{d/t}$, $b_{d/t}$ and $c_{d/t}$. The displacement of each axis is measured and plotted simultaneously over the predetermined period of time (60 milliseconds for example). The velocity of each axis movement can thus be calculated based on the distance traveled over a given time period. Based on the changes plotted at $p_0$, $p_1$ and $p_2$, a look-ahead velocity curve is calculated for each axis. A projected path and the point designated as $P_{probable}$ are derived from the look-ahead velocities along the look-ahead velocity curve. $P_{probable}$ represents the anticipated position of the corresponding axis for the latency-corrected viewing frame. The position and perspective of the image presented to the viewer is then modified and a "look-ahead" frame is generated based upon $P_{probable}$. This look-ahead frame is a nearly perfect representation of the current viewing position, having been adjusted for the time delay introduced by computation, frame-rendering, and the like. The look-ahead frame is thus rendered to the view in the exact or nearly the exact time frame as the intended current image, without latency.

A dampening factor is also subtracted from the look-ahead velocity in the calculation of $P_{probable}$. This factor allows the viewer to overcome the instability of the displayed motion during sudden positional changes which happens because the actual viewed image is offset ahead of the calculated image to overcome latency. The instability appears to the viewer as an image bouncing ahead each time a frame is rendered before stabilizing in the intended position. The dampening factor smoothes out extreme accelerations during sudden positional changes to provide a stable displayed motion to the viewer.

The dampening factor is derived by measuring the velocity between three sampling points ($p_0$, $p_1$ and $p_2$) previous to the sampling point at which the velocity curve is calculated for the look-ahead position. The velocity calculated between the most recently occurring pulses is subtracted from the velocity that was calculated between the prior two pulses, which provides an acceleration of the movement of the viewer. The resultant difference (acceleration) is then multiplied by a dampening coefficient to provide the dampening factor. The dampening coefficient is a predetermined constant based on physical measurements and calculations. The dampening factor is finally subtracted from the current look-ahead velocity in the look-ahead. This has the effect of reintroducing latency to the look-ahead calculation so that sudden changes will not be reacted to unless they occur for two consecutive pulses.

Figure 2:
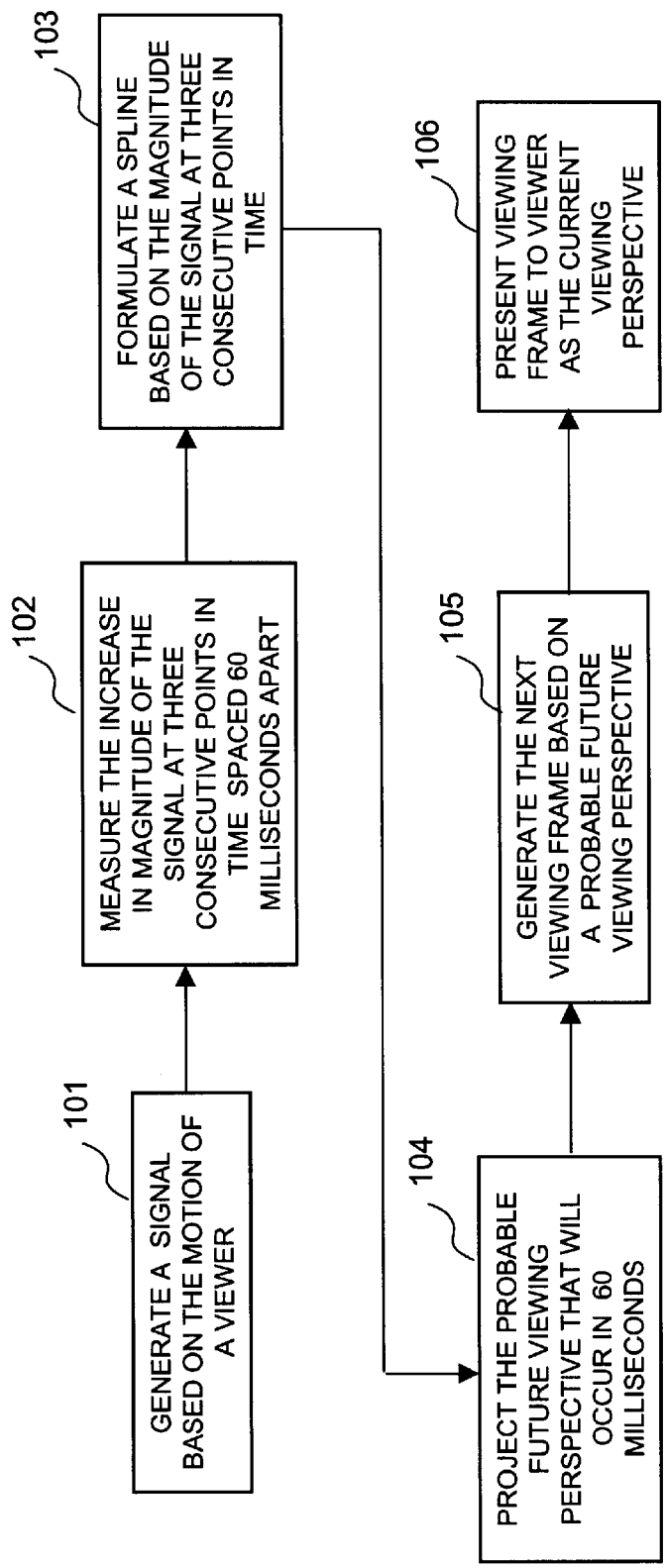
FIG. 2 is a flow diagram exemplifying the process of rendering a viewing frame in a real-time virtual reality system.

The primary steps in this method of compensating for the latency in the virtual reality system are shown in FIG. 2. As the viewer moves away from the current viewing perspective, an encoder signal comprising a sequentially increasing pulse counts is generated at 101. The signal is read and plotted by the host computer at predetermined time intervals at 102. A velocity curve is plotted based on the magnitude of the signal at two consecutive points in time at 103. A probable future axis path is formulated based on the velocity curve 104. Based on the velocity curve and the time interval, the probable future point $P_{probable}$ is then formulated at 105. From here, the process formulates the look-ahead calculation at 106. Then the dampening factor is calculated and added to the current look-ahead calculation at 107. From these calculations, the next viewing frame is generated based on the probable future view perspective at 108. Finally, the next viewing frame is presented to the viewer in the current view perspective at 109.

By generating the image slightly ahead of its actual occurrence, the latency created by data acquisition, computation, and the like is overcome, thus allowing the viewer to view the image in real time.

From the foregoing detailed description, it will be evident that there are a number of changes, adaptations and modifications of the present invention that come within the province of those persons having ordinary skill in the art to which the aforementioned invention pertains. However, it is intended that all such variations not departing from the spirit of the invention be considered as within the scope thereof as limited solely by the appended claims.

We claim:

1. A virtual reality viewing system comprising:

means responsive to selective motions of a viewer operable to generate signals corresponding to said motions providing a sequence of viewing perspectives;

means for measuring an increase in magnitude of each of said signals at selected time intervals;

means for generating a spline corresponding to the magnitudes of said signals at said selected time intervals and adjusted by a dampening factor;

means for projecting probable subsequent viewing perspectives corresponding to said adjusted spline that will occur in subsequent time intervals;

means for generating images corresponding to said probable subsequent viewing perspectives; and means for displaying said images to said viewer as current viewing perspectives.

2. A system according to claim 1 wherein said signal generating means comprises sensor means.

3. A system according to claim 2 wherein said sensor means comprises ultrasonic sensors for tracking positions by triangulation based on the varying time lag produced by different sets of emitters and receivers.

4. A system according to claim 2 wherein said sensor means comprises sets of coils pulsed to produce magnetic fields and magnetic sensors operable to determine positions by measuring the varying strengths and angles of said magnetic fields.

5. A system according to claim 2 wherein said sensor means comprises mechanical photo-optical pulse encoders operable to generate a plurality of pulses corresponding to changes of displacement between said encoders and a device on which they are mounted.

6. A system according to claim 1 wherein said signal processing means comprises a computer.

7. A system according to claim 1 wherein said means responsive to selected motions of said user is responsive to selected motions of the head of said viewer.

8. A system according to claim 7 wherein said selected motions include rotary and linear motions about and along selected axes.

9. A system according to claim 1 including a head-gear operable to be worn by said viewer and wherein said displaying means is disposed on said head gear.

10. A system according to claim 1 wherein said dampening factor comprises a difference between a pair of consecutive velocities of said motions of said viewer multiplied by a dampening coefficient.

11. A system according to claim 10 wherein said velocities correspond to the magnitudes of said signals in relation to the selected time intervals.

12. A virtual reality viewing system comprising:
a camera disposed at a site remote from a viewer, operable to train on an environment to be virtually viewed;
means responsive to selected motions of said viewer operable to generate signals corresponding to said motions providing a sequence of viewing perspectives;
means for measuring an increase in magnitude of each of said signals at selected time intervals;
means for generating a spline corresponding to the magnitudes of said signals at said selected time intervals and adjusted by a dampening factor;
means for projecting probable subsequent viewing perspectives corresponding to said adjusted spline that will occur in subsequent time intervals;
means for training said camera generating images corresponding to said probable subsequent viewing perspectives; and
means for displaying said images to said viewer as current viewing perspectives.

13. A virtual reality viewing method including:
sensing selected motions of a viewer;
generating signals corresponding to said selected motions of said viewer representing a sequence of viewing perspectives;
measuring an increase in magnitude of each of said signals at selected time intervals;
generating a spline corresponding to the magnitudes of said signals at said selected time intervals and adjusted by a dampening coefficient;
projecting probable subsequent viewing perspectives corresponding to said adjusted spline that will occur at subsequent time intervals;
generating images corresponding to said probable subsequent viewing perspectives; and
displaying said images to said viewer as current viewing perspectives.

14. The method of claim 13 wherein said sensing of selected motions of said viewer comprises ultrasonically tracking said motions by a triangulation method based on the varying time lags produced by different sets of emitters and receivers.

15. The method of claim 13 wherein said sensing of selected motions of said viewer comprises generating pulsed magnetic fields and measuring the varying strengths and angles of said fields.

16. The method according to claim 13 wherein said selected time intervals consist of 60 millisecond intervals.

17. The method according to claim 13 wherein said subsequent time intervals consist of 60 millisecond intervals.

18. The method according to claim 13 wherein said dampening factor is generated by determining a difference between a pair of consecutive velocities of said motions of said viewer and multiplying said difference by a dampening coefficient.

19. The method according to claim 18 wherein said velocities are determined by relating the magnitudes of said signals to the selected time intervals.

* * * * *

UNITED STATES PATENT AND TRADEMARK OFFICE
CERTIFICATE OF CORRECTION

PATENT NO. : 6,839,041 B2
DATED : January 4, 2005
INVENTOR(S) : Kenneth J. Susnjara et al.

It is certified that error appears in the above-identified patent and that said Letters Patent is hereby corrected as shown below:

Title page,
Item [75], Inventors, "Kenneth J. Susnfara" should read -- Kenneth J. Susnjara --

Signed and Sealed this

Twenty-first Day of June, 2005

JON W. DUDAS
*Director of the United States Patent and Trademark Office*